US 6,707,021 B2

(12) United States Patent
Fujimoto et al.

(10) Patent No.: US 6,707,021 B2
(45) Date of Patent: Mar. 16, 2004

(54) TRANSPARENT MEDIUM PROCESSING DEVICE

(75) Inventors: Masatoshi Fujimoto, Hamamatsu (JP); Shinichiro Aoshima, Hamamatsu (JP); Hiroshi Kumagai, Wako (JP); Katsumi Midorikawa, Wako (JP)

(73) Assignee: Hamamatsu Photonics K.K., Shizouka (JP)

( * ) Notice: Subject to any disclaimer, the term of this patent is extended or adjusted under 35 U.S.C. 154(b) by 0 days.

(21) Appl. No.: 10/098,317

(22) Filed: Mar. 18, 2002

(65) Prior Publication Data

US 2002/0130245 A1 Sep. 19, 2002

(30) Foreign Application Priority Data

Mar. 19, 2001 (JP) ...................... P2001-078671

(51) Int. Cl.$^7$ ................................. G01J 1/32
(52) U.S. Cl. ...................... 250/205; 250/552
(58) Field of Search ................. 250/205, 552, 250/559.07, 559.08, 559.09; 359/237, 264, 262, 279, 298, 465

(56) References Cited

U.S. PATENT DOCUMENTS 6,071,765 A    6/2000  Noguchi et al. ............ 438/166

FOREIGN PATENT DOCUMENTS

JP    10-223959    8/1998
JP    2000-283854  10/2000

*Primary Examiner*—David Porta
*Assistant Examiner*—Seung C. Sohn
(74) *Attorney, Agent, or Firm*—Morgan, Lewis & Bockius LLP

(57) ABSTRACT

The transparent medium processing device comprises: a light control section 2 for performing variable control for the status of the laser beam emitted from the light source section 1, and a light status measurement section 4 for measuring the status of the laser beam inside the processing target TG. The light control section is adjusted based on the output of the light status measurement section so that the status of the laser beam inside the processing target becomes a desired status. Since the status of the laser beam inside the processing target, which is made of such a transparent medium as glass, is measured by the light status measurement section, and is fed back to the light control section, laser processing can be executed while maintaining an optimum status at a processing point inside the processing target.

7 Claims, 14 Drawing Sheets

TIME WAVEFORM SHAPING SECTION 21

TIME WAVEFORM SHAPING SECTION 21

LUMINOUS FLUX L1

TIME WAVEFORM SHAPING SECTION 21

LUMINOUS FLUX L1

TIME WAVEFORM SHAPING SECTION 21

LUMINOUS FLUX L1

231

WAVE FRONT CONTROL SECTION 23

LUMINOUS FLUX L1

PROCESSING TARGET TG

SCATTERED LIGHT

410

411

412

413

WAVELENGTH

TIME

LIGHT STATUS MEASUREMENT SECTION 4

TRANSPARENT MEDIUM PROCESSING DEVICE

BACKGROUND OF THE INVENTION

1. Field of the Invention

The present invention relates to a transparent medium processing device which processes a transparent medium (e.g. glass, plastic) using pulse laser beams.

2. Related Background Art

Technologies to process inside glass using laser is receiving heated attention recently. For example, technologies to implement an optical wave guide, optical memory, and-diffraction grating by changing the refractive index inside glass or modifying material inside glass is known, and these are highly anticipated as candidates to be devices which can perform such processing as computation by optically. Also in the field of micro-chemistry, micro-puncturing inside glass is necessary, and performing this by laser is being attempted.

If optimum optical pulses can be provided for such laser processing, flexibility in processing shapes improves, and the energy required for processing can be decreased. Also to popularize a device which requires rework non-periodically, an inexpensive light source is desired, so in order to popularize a three-dimensional optical memory built in to a standard computer, for example, a semiconductor laser is preferable as the light source, however it is necessary to set conditions to optimize the processing efficiency so that sufficient processing can be performed with the light quantity of a semiconductor-laser.

SUMMARY OF THE INVENTION

In this way, in order to implement glass processing appropriately, it is necessary to provide optical pulses in an optimum status according-to the processing target and processing content. However even if optical pulses are set in an optimum status, the laser light entering the processing target is not always in an optimum status at the processing point. For example, the dispersion of light is high inside glass, and it cannot be ignored that the medium exhibits non-linearity with respect to strong pulses, so the laser beam deviates from the set optimum status at the processing point.

Therefore it is desirable to monitor the processing point while processing with irradiating laser beams on the processing target, and to feed back this information so that the optical pulse are adjusted to obtain the desired processing result. For feedback, however, what is monitored is critical, but only X-rays and fluorescent lights, which are emitted as an indirect result of laser processing, or the transmitted light of the laser beam used for processing, are monitored in the case of the examples recently attracting attention, where the optimum status is not setup.

With the foregoing in view, it is an object of the present invention to provide a transparent medium processing device which monitors the status of light at a location (processing point) where interaction between a laser beam for processing and a processing target occurs when the transparent medium is processed by a laser beam so that the transparent medium can be processed in an optimum status.

A transparent medium processing device according to the present invention comprises: a light source section for generating a laser beam with a wavelength which has transparency with respect to a processing target, a light control section for executing variable control for the status of a laser beam emitted from the light source section, an incident optical system section for entering the laser beam controlled by the light control section to the processing target, and a light status measurement section for measuring the status of the laser beam inside the processing target, wherein the light control section is adjusted based on the output of the light status measurement section so that the status of the laser beam inside the processing target becomes a desired status.

According to the present invention, the status of the laser beam inside the processing target which is made of such a transparent medium as glass is measured by the light status measurement section and is fed back to the light control section, where the status of the laser beam emitted from the light source section is variably-controlled, so the status of the laser beam inside the processing target is adjusted to be a desired status. Therefore laser processing can be executed while maintaining the optimum status at the processing point.

In the present invention, it is preferable that the light source section is a pulse laser light source for generating a femto-second pulse laser beam, and it may be characterized in that the light control section includes a time waveform shaping section for shaping a time waveform of the laser beam, or includes a spatial form shaping section for shaping a spatial form of the laser beam, or includes a wave front control section for controlling a wave front of the laser beam, or has a configuration which is combined thereof.

In the present invention, it may be characterized in that the light status measurement section further comprises a light track observation unit for detecting the track of the laser beam inside the processing target, or it may be characterized in that the light status is measured by observing the scattered light from inside the processing target, or the light status is measured by observing with a streak camera after dispersing the scattered light from the inside of the processing target by a spectroscope, or the light status is measured by observing the scattered light from the inside of the processing target with a pulse width monitor.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

The transparent medium processing device according to the first to seventh embodiments of the present invention will now be described with reference to the accompanying drawings.

First Embodiment

Figure 1:
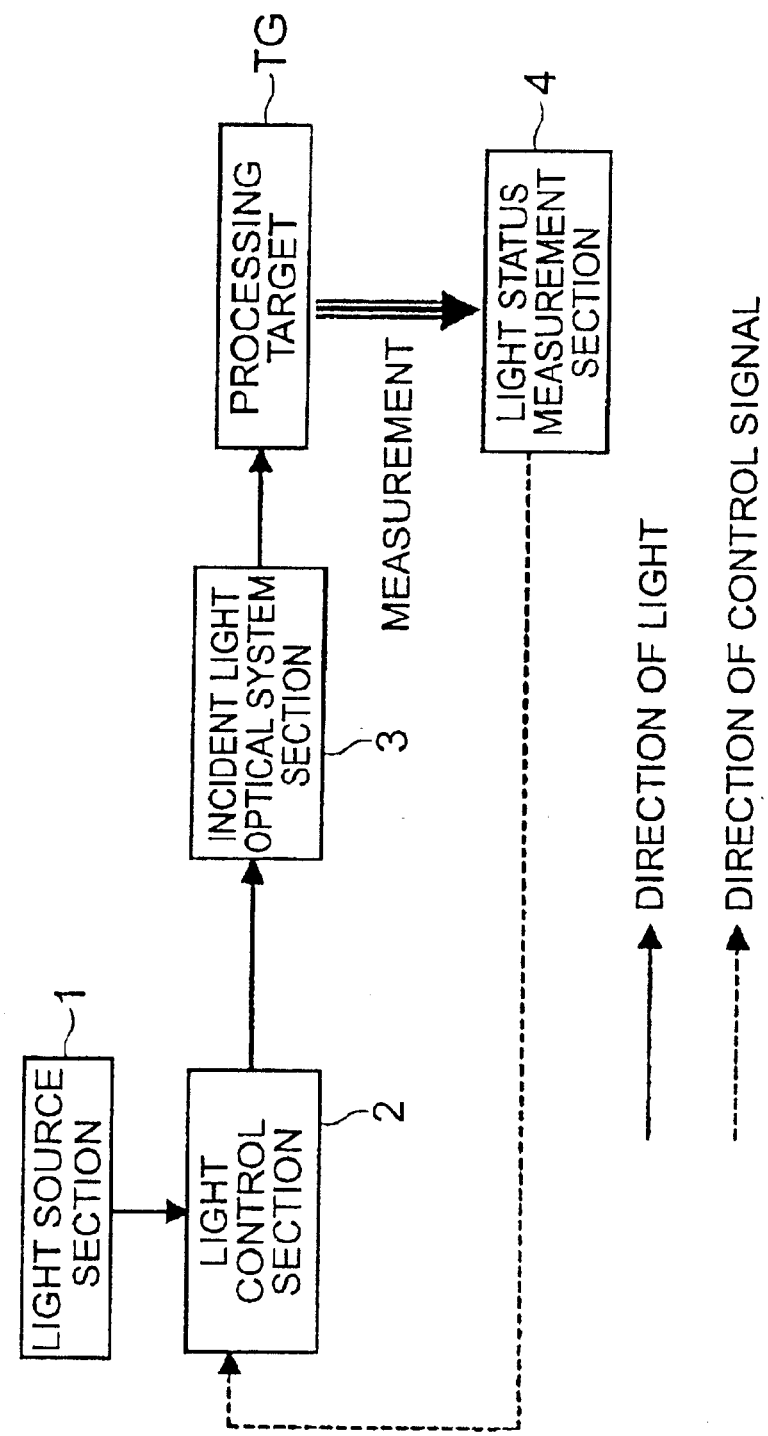
FIG. 1 is a block diagram depicting the first embodiment of the transparent medium processing device.

FIG. 1 is a block diagram depicting the first embodiment of the transparent medium processing device. This processing device comprises a light source section 1 for outputting a pulse laser beam, a light control section 2 for providing a predetermined modulation of this output pulse, and an incident optical system section 3 which condenses the modulated pulse light and enters it to the processing target TG. The transparent medium processing device further comprises a light status measurement section 4 for measuring the spatial spread of the laser beam, the shape of the spot, and other light statuses, where the control signal, which is output from here, is configured so as to be fed back to the light control section 2, and is configured so as to process such a processing target TG as glass.

Now the behavior of light at the processing point inside the processing target TG will be described. At first, the light entered into the processing target TG causes an alteration of material or structure, such as a change in the refractive index or a destruction of the transparent medium at a predetermined position in the processing target TG. Here the status of the light at the processing point has a major influence on the processing result, so observing the light status at the processing point is very useful to control the light status and the processing result.

Therefore the status of the light at this processing point is measured by the light status measurement section 4. And this observation result is fed back to the light control section 2 as a control signal, and the light control section 2 is adjusted so that the behavior of the light at the processing point of the transparent medium can be a predetermined status which has been set in advance.

Second Embodiment

Figure 2:
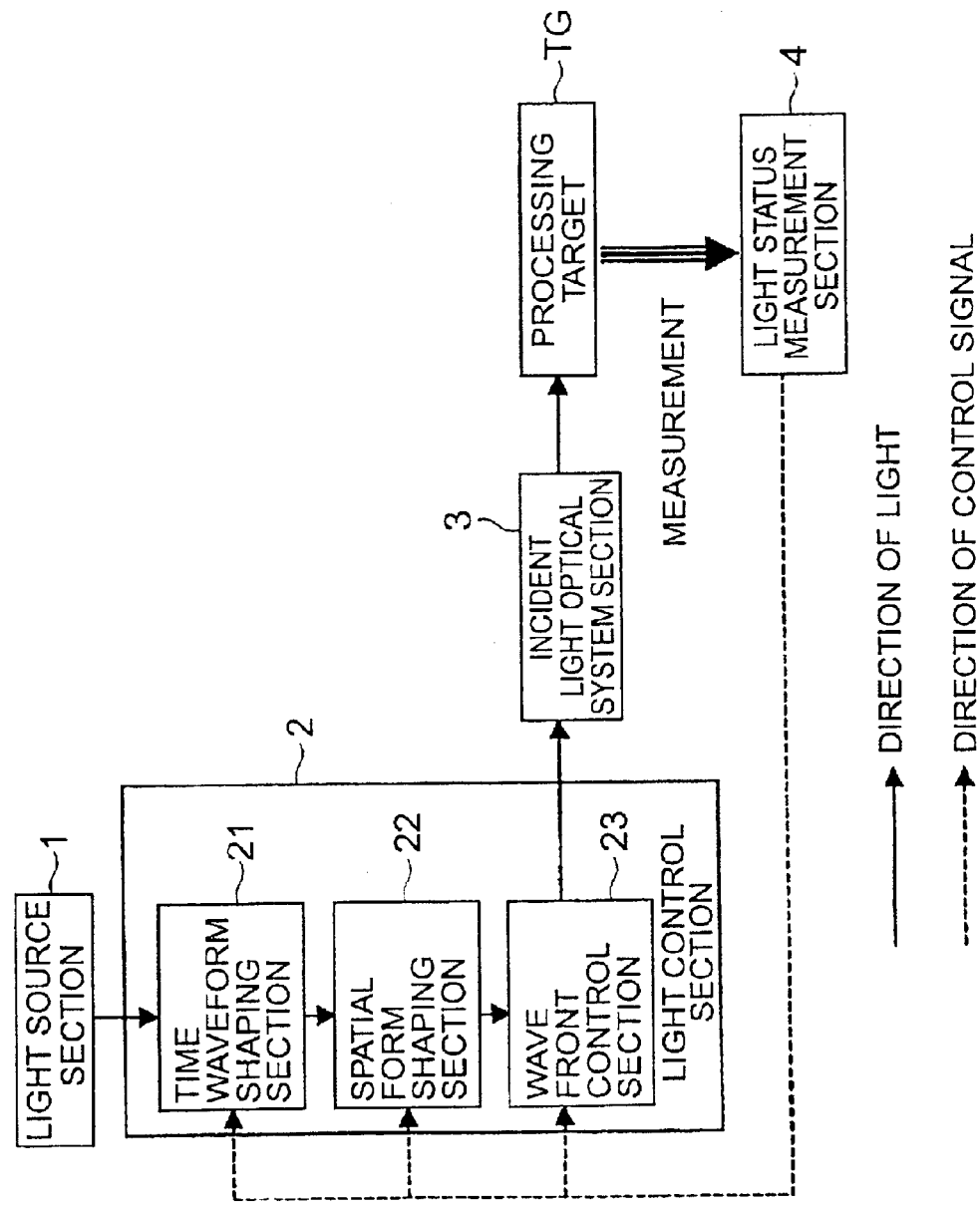
FIG. 2 is a block diagram depicting the second embodiment of the transparent medium processing device.

FIG. 2 is a block diagram depicting the second embodiment of the transparent medium processing device. The light source section 1, incident optical system section 3, and light status measurement section 4 have the same configuration as the first embodiment. In this embodiment, the light control section 2 can have a configuration which is different depending on the type of the modulation to be provided to the laser beam for processing. In other words, the light control section 2 can be comprised of a time waveform shaping section 21, a spatial form shaping section 22, a wave front control section 23, or an arbitrary combination thereof.

In this embodiment, the light control section 2 (time waveform shaping section 21, spatial form shaping section 22, wave front control section 23 or a combination thereof) is adjusted based on the result measured by the light status measurement section 4. For example, when the pulse width changes between before entering and after entering the processing target TG (this often occurs), the pulse width is optimized by adjusting the time waveform shaping section 21 so as to obtain a desired pulse width at a processing point inside the processing target TG. To obtain a desired processing shape, the spatial distribution of light can be optimized by adjusting the spatial form shaping section 22. If the distribution and non-linearity of the processing target TG and an aberration of the incident optical system section 3 are the problem, then the wave front is optimized by adjusting the wave front control section 23.

A combination of each element of the light control section 2 for adjustment is arbitrary, and the adjustment of the time waveform shaping section 21, for example, may improve the processing shape, so this adjustment must be performed according to circumstances depending on the actual situation of the processing.

CONCRETE EXAMPLE OF TRANSPARENT MEDIUM PROCESSING DEVICE

Figure 3:
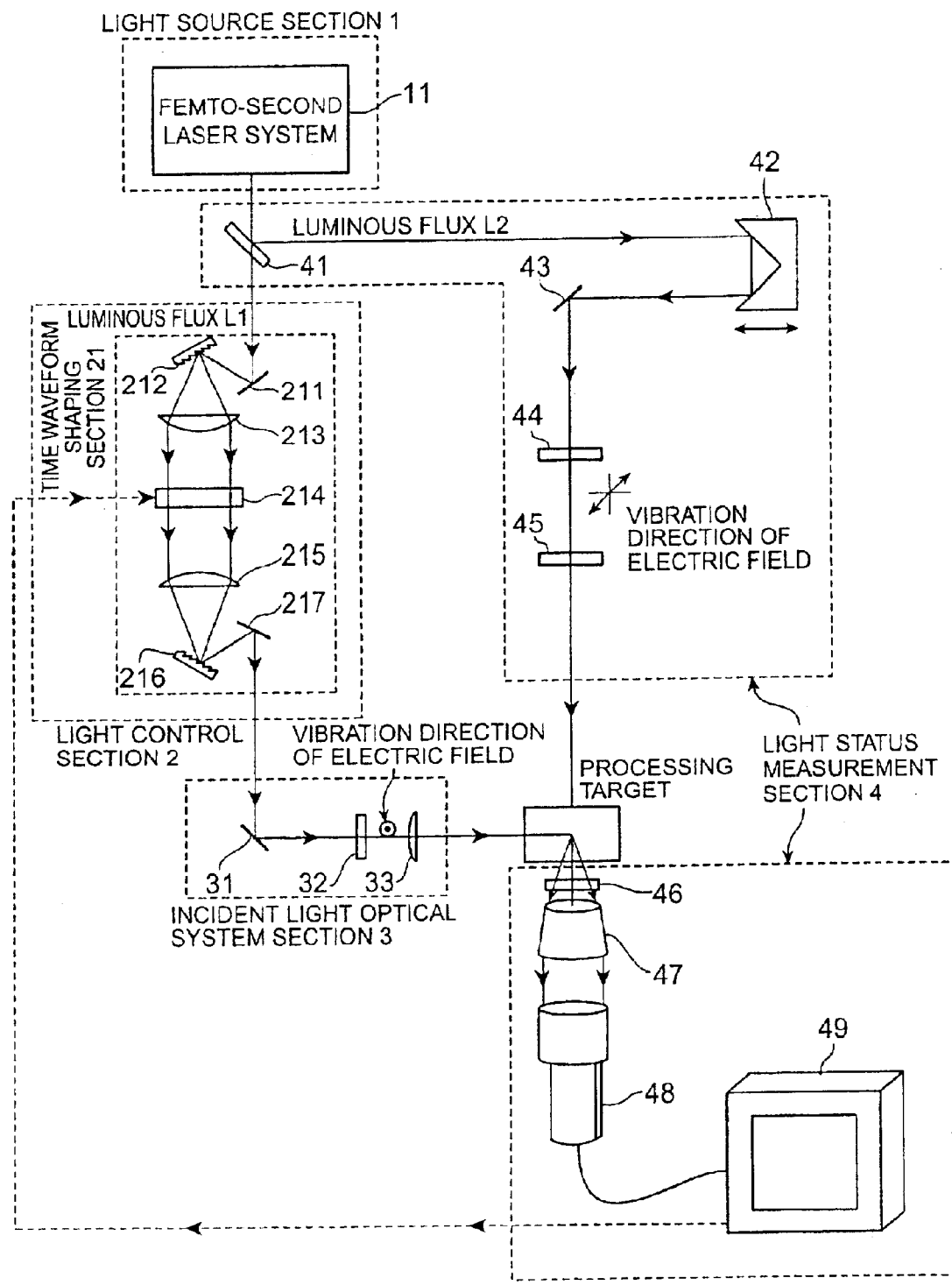
FIG. 3 is a diagram depicting a concrete example of the transparent medium processing device.

FIG. 3 shows a configuration of a concrete example of the transparent medium processing device according to the first or second embodiment. In this example, a rectangular parallelepiped made of glass is assumed as the processing target TG. And a light track observation unit disclosed in Japanese Patent Laid-Open No. 2000-283854, for example, is used as the light status measurement section 4.

According to this publication, this device is a light track observation unit which can directly observe the track of a light pulse without invasion, which branches the light pulses from the ultra-short pulse light source, such as a high intensity femto-second laser, by a light branching unit, and guides the light pulses to a detection medium (e.g. liquid or gas having a non-linear optical effect) as an excitation pulse and a probe pulse having a predetermined linear polarization status respectively by the excitation optical system and the probe optical system. At this time, a probe pulse is irradiated onto the light track area, which is generated in the detection medium by entering an excitation pulse, where an anisotropic refractive index change has occurred due to the non-linear optical effect, and the probe pulse component where the polarization status has changed by passing through the light track area, out of the components which passed through the detection medium, is detected by a camera in the light detection section via an analyzer, so that an instantaneous intensity distribution of the excitation pulses at a predetermined time can be observed.

In the present example, the femto-second laser system 11 is used for the light source section 1. A method of partially changing the refractive index inside the glass or puncturing the inside by condensing the laser inside the glass has been known, but it is preferable that the laser used here functions only at the condensing point of the glass. Therefore it is common to execute laser processing in a multiple photon process in a wavelength area of the glass where transmittance is high, and the light source appropriate for this application is a femto-second laser. If a greater energy is required for processing, a regenerative amplification system or multi-path amplification system can be added.

For the femto-second laser light equipment which can be applied as the light source section 1, various waveform shaping technologies are known, as stated in IEEE Journal of Quantum Electronics, Vol. 28, No. 4, April 1992, for example. Also a reflecting mirror technology with a movable part to compensate for the wave front has been established, and time and spatial modulation can be performed on light pulses using these technologies. As a result, a light reactor (an equipment to cause a light reaction which is an interaction between light and matter), described in Japanese Patent Laid-Open No. 10-223959, for example, has also been proposed.

The optical reactor according to this publication is an optical reactor which can cause an optical reaction by outputting a light waveform to automatically obtain an optimum reaction efficiency, wherein a light waveform transformation means for transforming a pulse light waveform is connected on the optical path of the light source via an input light guiding means comprised of a condensing lens and optical fibers, and the transformed pulse light is guided to a light reaction means for executing a predetermined light reaction function via an output light guiding means. The light waveform transformation means has a spatial light modulator and diffraction grating, and the transformation of a light waveform is controlled by a light waveform control means. The light waveform control means is connected to a reaction efficiency measurement means (comprised of a streak camera, etc.) for measuring the reaction efficiency of the light reaction function, and a storage means for storing the reaction efficiency and the light waveform control parameters. The light waveform control means is equipment to transform a light waveform according to a predetermined sequence, automatically determining the optimum light waveform comparing the reaction efficiency to be obtained, and controlling (the light waveform) to be fixed to the optimum light waveform.

As FIG. 3 shows, a light branching unit 41 is installed in the previous stage for guiding the light from the light source section 1 to the light control section 2, by which two luminous fluxes L1 and L2 are generated. Here one luminous flux L1 is for processing the transparent medium (processing target TG), and is guided to the light control section 2. The other luminous flux L2 is for monitoring the pulse forms at the processing point of the transparent medium. In FIG. 3, the transmitted light is the luminous flux L1, and the reflected light is the luminous flux L2, but needless to say, vise versa is also possible. In this example, a system comprised of only the time waveform shaping section 21 is shown along as an example of the light control section 2, but this may be a spatial form shaping section 22, a wave front control section 23, or a combination thereof.

For the luminous flux L1 guided to the light control section 2, the time-based waveform is modulated in the time waveform shaping section 21. As illustrated, the laser luminous flux L1 for processing is reflected by the reflecting mirror 211, then is dispersed by the diffraction grating 212, and is transformed into parallel lights by the cylindrical convex lens 213. And the phase for each spectrum is changed using the spatial light modulator 214, and the lights are condensed onto the diffraction grating 216 by the cylindrical convex lens 215 so as to implement a time-based waveform modulation.

The luminous flux L1 modulated by the light control section 2 is reflected by the reflecting mirror 217 and is guided to the incident optical system 3. The light which optical path was changed to a predetermined optical path by the reflecting mirror 31 is changed to a predetermined polarization status using a phase shifting plate 32, such as a λ/2 plate, and is condensed to the processing target TG by the condensing lens 33. The phase shifting plate 32 is used here because the light track observation unit disclosed in Japanese Patent Laid-Open No. 2000-283854 (the name of the invention in this publication is "Light Track Detection Unit") demands necessary conditions for the polarization of the measurement target light (here luminous flux L1).

As FIG. 3 shows, it is preferable that the luminous flux L1 is a linearly polarized light having the vibration direction of an electric field in a direction perpendicular to the page face, but if sensitivity is not demanded, merely having an electric field component perpendicular to the page face is sufficient. If the light emitted from the light control section 2 directly satisfies these polarization conditions, then the phase shifting plate 32 can be omitted. The femto-second laser used for the light source has a wide band wavelength component, so it is preferable that the phase shifting plate 32 to be used is of the first order.

For the luminous flux L2 for monitoring, timing with the luminous flux L1 is changed via the variable optical delay 42. Here this variable optical delay 42 may be inserted within the optical path of the luminous flux L1. Then the luminous flux L2 is reflected by the reflecting mirror 43, is transmitted through the phase shifting plate 44, such as a λ/s plate, and is transformed to a linearly polarized light having the vibration direction of an electric field in a 45° direction with respect to the page face in FIG. 3. Here as well, it is preferable that the phase shifting plate 44 to be used is of the first order. Then the quenching ratio of the linear polarization is improved by the polarizer 45, and the luminous flux L2 is entered to the processing target TG in a direction perpendicular to the luminous flux L1, for example. Here if timing matches with the luminous flux L1, double refraction which reflects the form of the luminous flux L1 is generated at the processing point because of the change of the anisotropic refractive index induced by the luminous flux L1. The luminous flux L2 changes the polarization status when passing through this area because of this induced double refraction.

By installing the analyzer 46 for L2 after passing through the processing target TG so that only the polarized component in a direction perpendicular to the incident light L2 passes through, only the component changed in polarization can be extracted. Here the instantaneous form of the luminous flux L1 at the processing point can be measured by forming an image of the luminous flux L2 which passed through the analyzer 46 on the image capturing device 48, such as a CCD camera by the relay lens 47 focused on the processing point. To observe this form, a signal from the image capturing device 48, for example, is displayed on the monitor screen 49. The analyzer 46 can be built in to the relay lens 47.

Under the above arrangement, the width of the laser luminous flux L1 for processing in the propagation axis direction (time width) at the processing point of the processing target TG, which is expected to greatly deviate from that at the entering time due to the dispersion and the non-linear effect of the glass, can be measured using a light status measurement section 4. It is expected that the energy required for processing can be decreased by adjusting this time width to be the shortest at the processing point. So the phase modulation amount of the spatial light modulator 214 in the time waveform shaping section 21 is changed so that the time width becomes shortest.

For this, light emitted from the laser light source is used as is, executing only an energy adjustment, such as extinction, in the glass processing based on the current technology. Therefore it is expected that the pulse width at the processing point is much wider due to the dispersion of light and the non-linearity inside the glass. For example, when the spread of the pulse width is 10 times or more, about 1/10 of the energy required for the current laser processing is sufficient if the incident pulse waveform is adjusted such that the pulse spread is optimized to be the shortest at the processing point under the setting conditions. Therefore, by the present invention, applications of a compact and light processing device based on a semiconductor laser increases dramatically.

It is known that a high intensity laser beam causes a channeling phenomena due to the non-linearity of the medium. Since the channeling phenomena is a processing having high non-linearity, the accurate channeling status cannot be known merely by conventionally observing the incident light and the emitting light. But with the present invention, the channeling status itself can be monitored so as to control the device to an optimum status for processing.

Example 1 of Time Waveform Shaping Section 21

Figure 4:
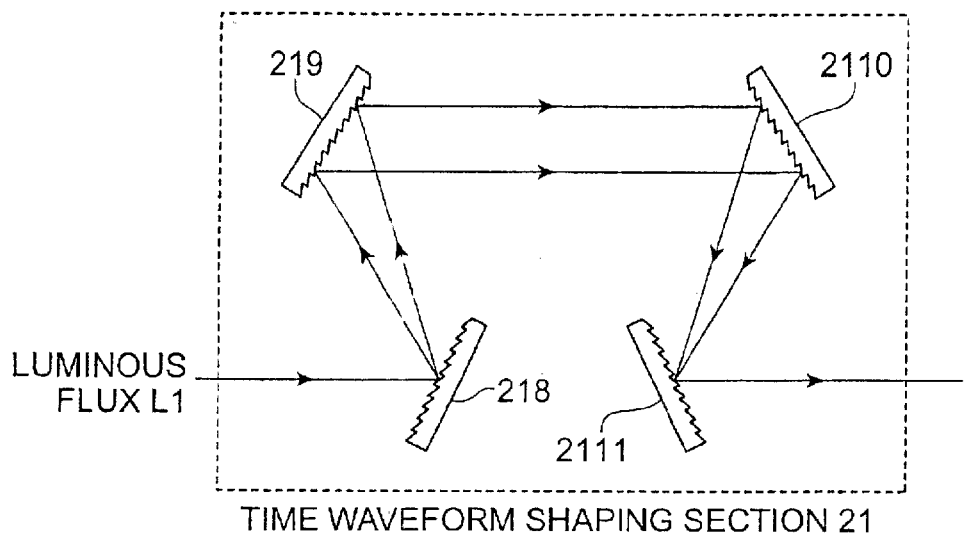
FIG. 4 is a diagram depicting Example 1 of the time waveform shaping section 21 to be applied to the transparent medium processing device.

FIG. 4 is a configuration of Example 1 of the time waveform shaping section 21 of the transparent medium processing device according to the embodiment shown in FIG. 2.

In Example 1, a system to provide a chirp to the pulse light is used for the time waveform shaping section 21. This is because for the time waveform of pulses, the behavior of the pulses at the processing point can often be improved to be more appropriate merely by providing a chirp, without controlling the form thereof. Actually this improvement is almost perfect if the width of the luminous flux L1 in the propagation axis direction, that is, the change in the processing target TG in the time width, is caused only by linear dispersion with respect to the wavelength.

In FIG. 4, the luminous flux L1 dispersed by the diffraction grating 218 is transformed into parallel lights by the diffraction grating 219. Parallel lights are comprised of lights having different wavelengths depending on the cross-section. Therefore parallel lights follow different optical paths depending on the wavelength. By focusing these parallel lights to one point by the diffraction grating 2110, and transforming it again into parallel lights by the diffraction grating 2111, parallel lights are transformed into luminous flux where the optical path difference between each wavelength is transformed into the time axis direction of the pulse. Here an optimum chirp can be obtained by adjusting the position and the angle of each diffraction grating.

In the above configuration, the number of diffraction gratings can be decreased by combining optical systems in an optimum way. For example, a chirp system can be created with only one diffraction grating by reflecting light four times onto the same diffraction grating. The above mentioned configuration is an arrangement for compensating for the dispersion of glass, but in some cases a chirp opposite the above can be provided. This can be implemented merely by changing the arrangement of the diffraction gratings.

Example 2 of Time Waveform Shaping Section 21

Figure 5:
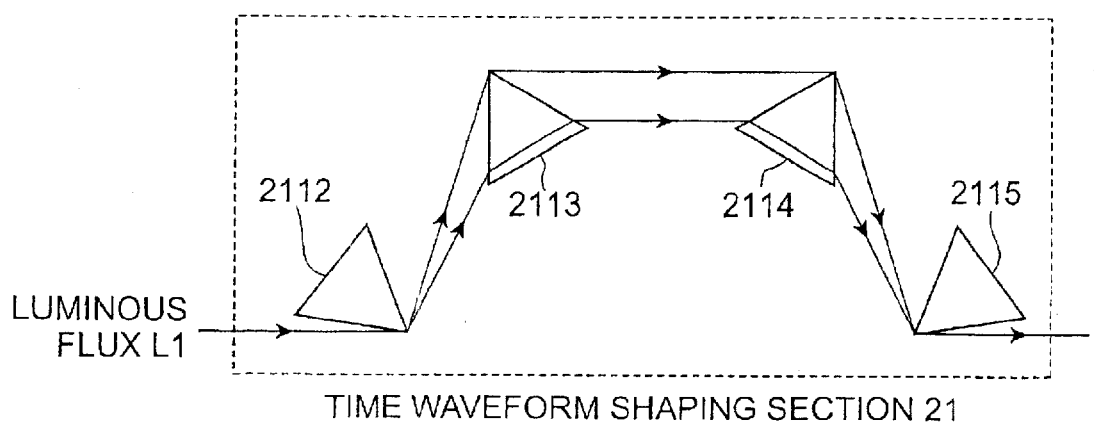
FIG. 5 is a diagram depicting Example 2 of the time waveform shaping section 21 to be applied to the transparent medium processing device.

FIG. 5 is a concrete configuration of the time waveform shaping section 21 of the transparent medium processing device according to the embodiment shown in FIG. 2.

In this example, a system to provide a chirp to a pulse light is used for the time waveform shaping section 21, just like Example 1. The luminous flux L1 dispersed by the prism 2112 is transformed into parallel lights by the prism 2113. Parallel lights are comprised of lights having different wavelengths depending on the cross-section. Therefore parallel lights follow different optical paths depending on the wavelength. By focusing these parallel lights onto one point by the prism 2114, and transforming it again into parallel lights by the prism 2115, parallel lights are transformed to be luminous flux where the optical path difference between each wavelength is transformed to be the time axis direction of the pulse. Here an optimum chirp can be obtained by adjusting the position and the angle of each prism.

The function of the time waveform shaping section 21 according to Example 2 is the same as Example 1 in terms of a linear chirp, but the difference lies in the tertiary phase dispersion amount. In other words, compensation is possible up to tertiary phase dispersion by combining with Example 1. In some cases, a chirp generator, according to this example, can be created by a system where prisms and diffraction gratings coexist.

In the above configuration, the number of prisms can be decreased by combining optical systems in an optimum way, just like Example 1. The above is an arrangement for compensating the dispersion of glass, but in some cases a chirp opposite the above can be provided. This can be implemented merely by changing the arrangement of prisms.

Example 3 of Time Waveform Shaping Section 21

FIG. 6 is a concrete configuration of the time waveform shaping section 21 of the transparent medium processing device according to the embodiment shown in FIG. 2. In Example 3, a system to provide a chirp to a pulse light is used for the time waveform shaping section 21, just like Examples 1 and 2. The system of this Example 3 is so compact that the system is very useful in applications to process a specialized processing target TG.

In other words, a variable chirp system was used in the above mentioned Examples 1 and 2, but if the application of processing is specialized, a predetermined chirp can be provided based on knowledge obtained by Examples 1 and 2, for example.

Figure 6A:
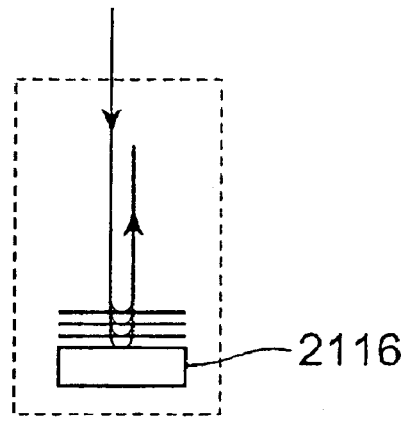
FIG. 6 is a diagram depicting Example 3 of the time waveform shaping section 21 to be applied to the transparent medium processing device.

This can easily be implemented by reflecting light onto a chirp mirror 2116, which is designed for such purposes as shown in FIG. 6(a). If a chirp mirror is used, design, considering the compensation of high order distribution, becomes possible, therefore use of a chirp mirror is very effective.

Figure 6B:
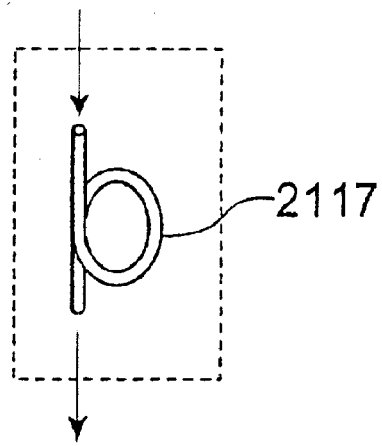

Another method is to propagate light in a medium which has a distribution characteristic the opposite of the processing target TG with an appropriate length. For example, as FIG. 6(b) shows, it is possible to allow light to pass through the optical fiber 2117 in order to provide an appropriate chirp to the pulse light. Some media may be combined to compensate high order dispersion by this method. The combination of a chirp mirror and a dispersion medium may be used.

Example 4 of Time Waveform Shaping Section 21

Figure 7:
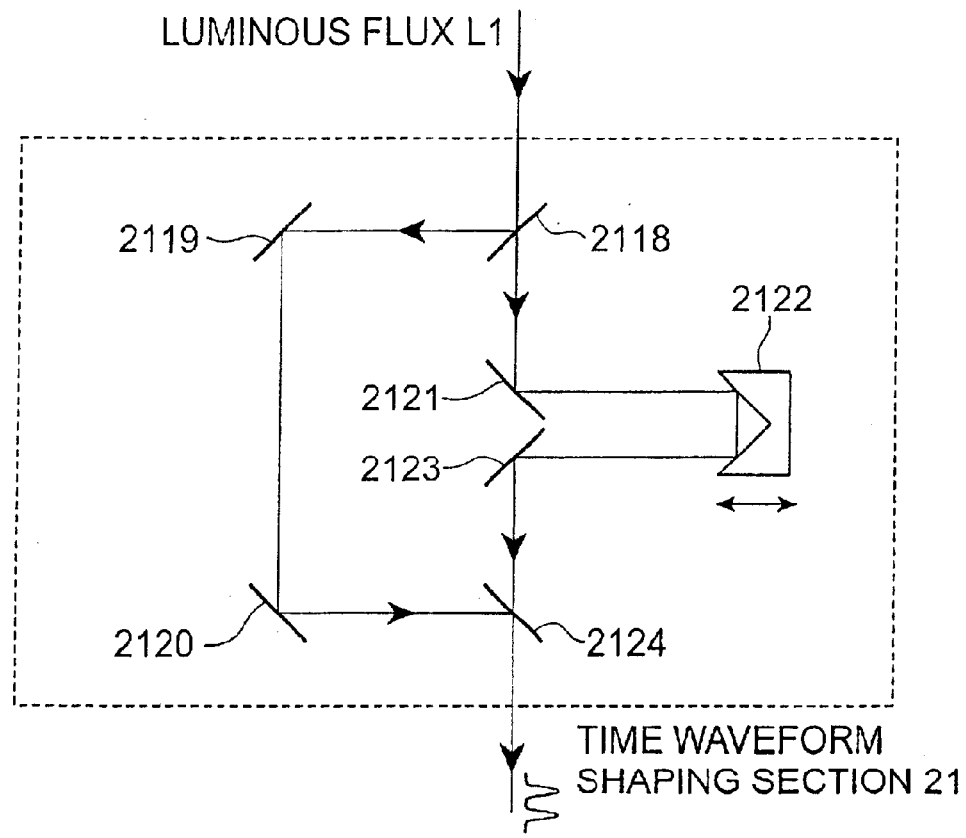
FIG. 7 is a diagram depicting Example 4 of the time waveform shaping section 21 to be applied to the transparent medium processing device.

FIG. 7 is a concrete configuration of the time waveform shaping section 21 of the transparent medium processing device according to the embodiment shown in FIG. 2. In Example 4, a system to transform a pulse light into a double pulse is used for the time waveform shaping section 21.

The luminous flux L1 which entered the time waveform shaping section 21 is split into two luminous fluxes by a light branching unit 2118 using a beam splitter, for example, and one luminous flux is guided to a photo-coupler 2124 using a beam splitter, for example. The other luminous flux has its direction changed by the reflecting mirror 2121, then passes through the variable optical delay 2122, its direction is changed again by the reflecting mirror 2123, and is guided to the photo-coupler 2124. And double pulses can be obtained with this arrangement. Here the pulse interval of the double pulse to be obtained can be controlled by moving the position of the variable optical delay 2122 in the arrow direction shown in FIG. 7.

When double pulses are generated in this way, double pulses can be processed into a predetermined status by raising the processing point to excitation status by the first pulse, and providing the second pulse in a status after a predetermined time has elapsed. This method is also helpful to improve the processing efficiency. The above double pulse generation is just an example, and other variable methods include a method of improving efficiency using a phase shifting plate and a polarization beam splitter, and another method is to use etalon. Depending on the characteristics of the processing target TG, a pulse train comprised of more pulses may be more effective, so an appropriate method suitable for the purpose should be used.

Example of Spatial Form Shaping Section 22

Figure 8:
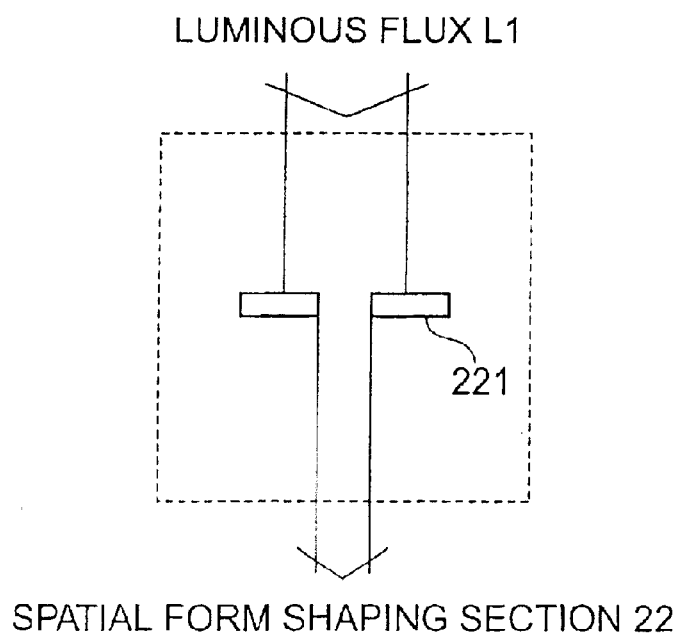
FIG. 8 is a diagram depicting an example of the spatial form shaping section 22 to be applied to the transparent medium processing device.

FIG. 8 is a concrete configuration of the spatial form shaping section 22 of the transparent medium processing device according to the embodiment shown in FIG. 2. In this example, a mask 221 to obtain a desired cross-sectional form of the beam is used for the spatial form shaping section 22. The shape of this mask can be electrically controlled. Because of this, it is possible to adjust the mask 221 in the spatial form shaping section 22 such that the cross-sectional distribution of the light pulses in the processing target TG obtained by the light status measurement section 4 has the same cross-sectional profile as the required processing shape.

Example of Wave Front Control Section 23

Figure 9:
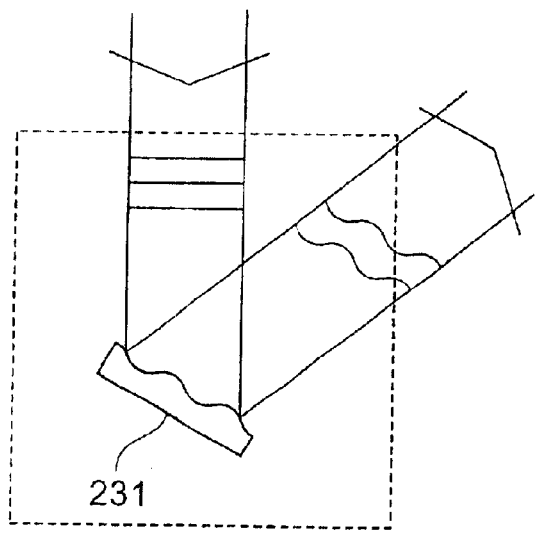
FIG. 9 is a diagram depicting an example of the wave front control section 23 to be applied to the transparent medium processing device.

FIG. 9 is an example depicting a concrete configuration of the wave front control section 23 of the transparent medium processing device according to the embodiment shown in FIG. 2. In this example, a deformable mirror 231 is used for the wave front control section 23. This deformable mirror is a reflecting mirror where the shape of the reflecting face can be electrically controlled.

Because of this, it is possible to adjust the deformable mirror 231 in the wave front control section 23 such that the cross-sectional distribution of the light pulses in the processing target TG obtained by the light status measurement section 4 has the same cross-sectional profile as the required processing shape. Also the time width of the pulse at the converging point can be controlled to some extent by adjusting the deformable mirror 231.

Example of Light Status Measurement Section 4

Figure 10:
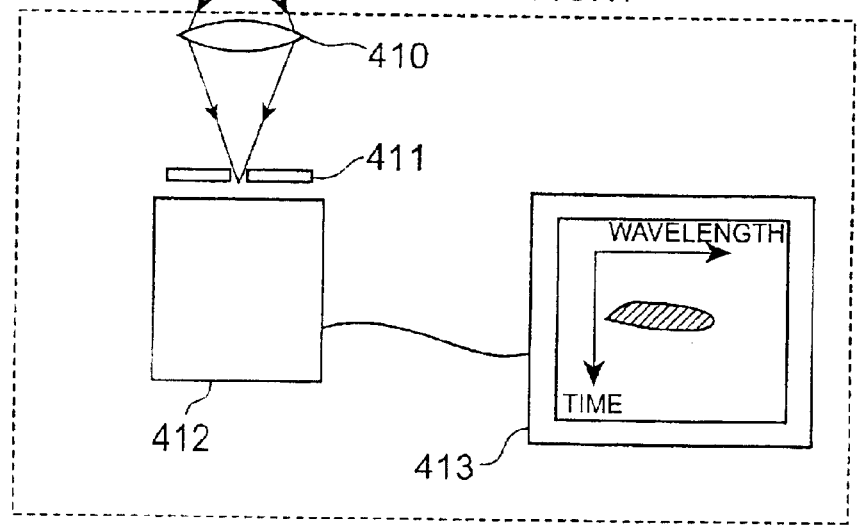
FIG. 10 is a diagram depicting Example 1 of the light status measurement section 4 to be applied to the transparent medium processing device.

FIG. 10 is a concrete configuration of the light status measurement section 4 of the transparent medium processing device according to the embodiment shown in FIG. 2. The laser luminous flux L1 for processing is scattered inside the processing target TG during processing, and the time characteristics of the scattered light correspond to the pulse width of the luminous flux L1. So the status of the luminous flux L1 can be known by measuring this scattered light. Therefore in this example, a system using a streak camera is used for the light status measurement section 4. Specifically, the scattered lights are condensed by the condensing lens 410, then light after passing through the slit 411 is observed by the streak camera 412. The time width of the luminous flux L1 for each spatial (cross-sectional direction) axis can be known by displaying the observation result on the monitor 413. While monitoring this time axis, the light control section 2 can be adjusted.

Example 2 of Light Status Measurement Section 4

Figure 11:
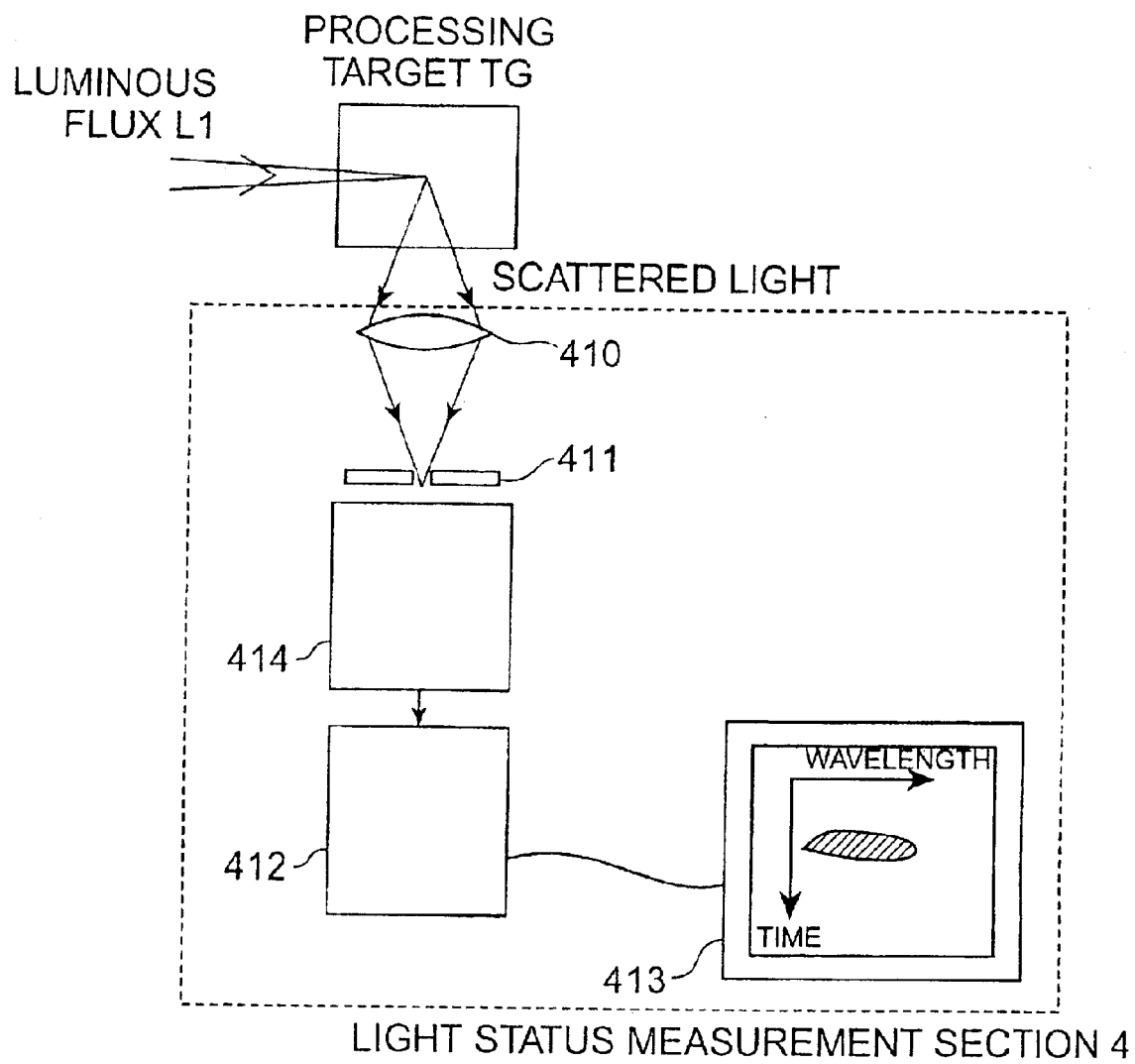
FIG. 11 is a diagram depicting Example 2 of the light status measurement section 4 to be applied to the transparent medium processing device.

FIG. 11 is a concrete configuration of the light status measurement section 4 of the transparent medium processing device according to the embodiment shown in FIG. 2. In this example, the spectroscope 414 is inserted before the streak camera 412 described in Example 1 for the light status measurement section 4. The time waveform for each waveform can be obtained by observing the light dispersed by the spectroscope 414 using a streak camera. The data displayed on the monitor 413 at this time is a two-dimensional image expressing the relationship between time and wavelength. If it is not actually necessary to obtain information on time characteristics, then the streak camera can be omitted. In this case, the status of a pulse can be inferred by the amount of wavelength change.

Example 3 of Light Status Measurement Section 4

Figure 12:
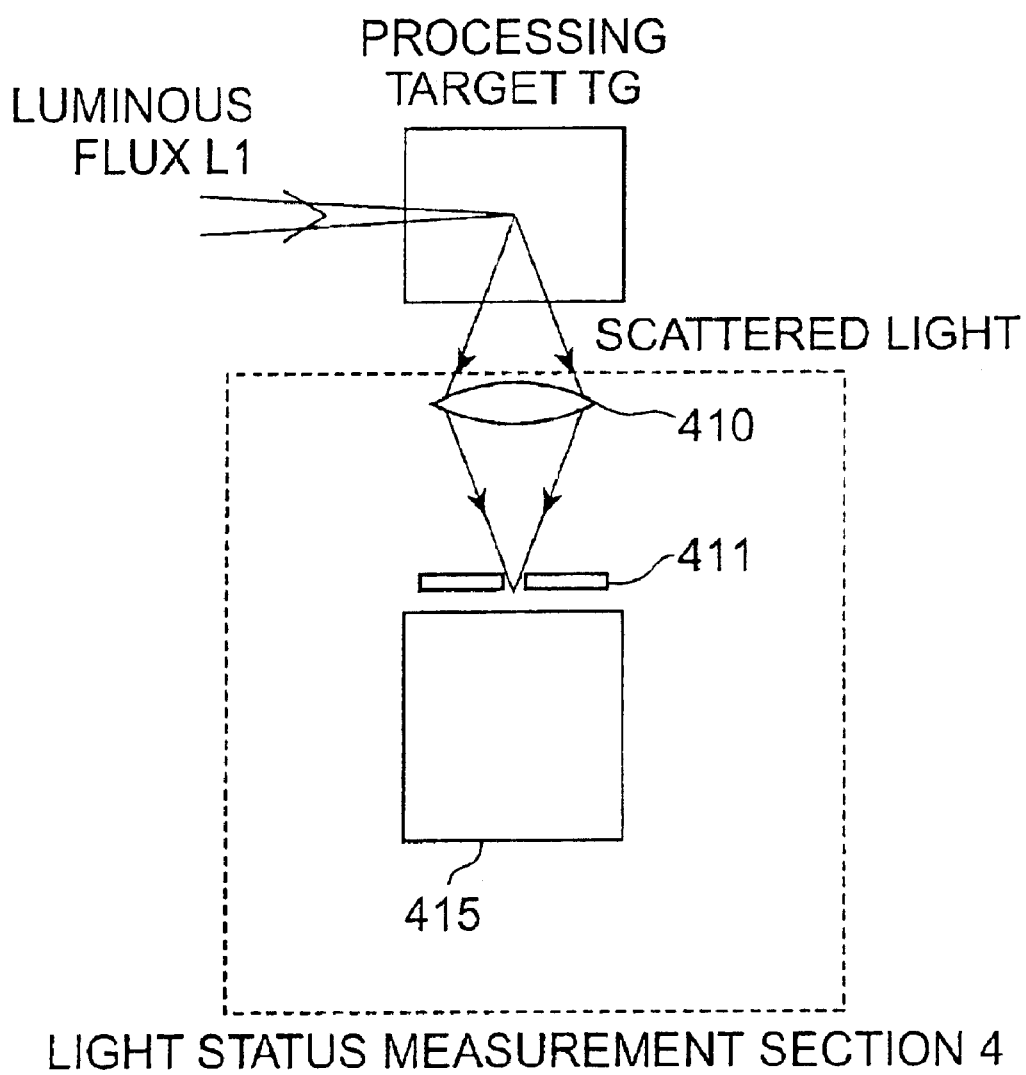
FIG. 12 is a diagram depicting Example 3 of the light status measurement section 4 to be applied to the transparent medium processing device.

FIG. 12 is a concrete configuration of the light status measurement section 4 of the transparent medium processing device according to the embodiment shown in FIG. 2. In this example, the pulse width monitor 415 is used for the light status measurement section 4. This is because it is preferable to make it possible to measure light status effectively even when the time characteristics of the scattered light is much faster than the time resolution of the streak camera. In this case as well, the quality of information to be obtained may improve by inserting the condensing lens 410 or the slit 411.

For this pulse width monitor 415, an auto correlation unit, for example, can be used. Information obtained at this time is on the time-based change of the intensity of a pulse. It is preferable to use FROG in order to achieve efficient control by obtaining phase information as well.

The above examples are shown only to describe concrete configurations of embodiments, and not for restricting the possibility of embodiments. Needless to say, the above examples can be combined freely.

Third Embodiment of Transparent Medium Processing Device

Figure 13:
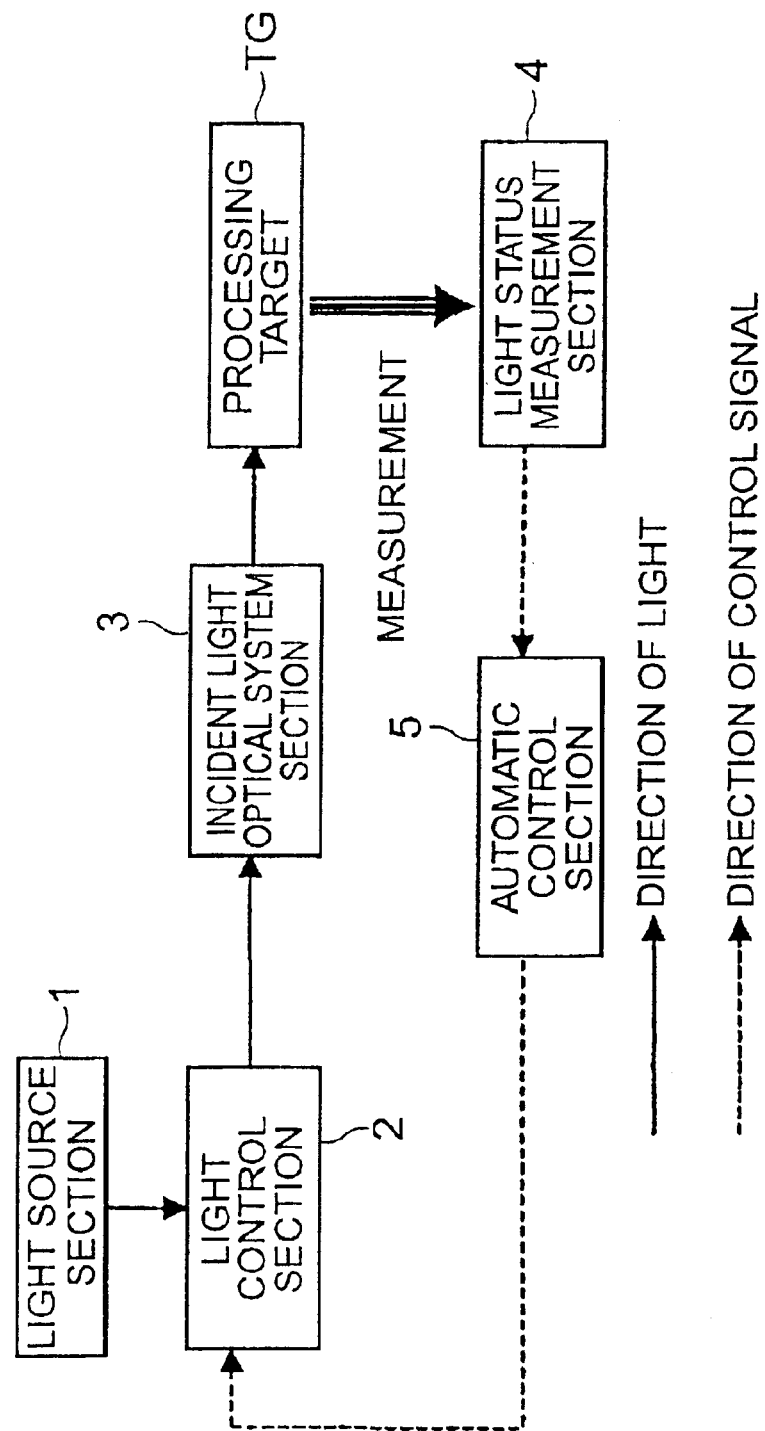
FIG. 13 is a block diagram depicting the third embodiment of the transparent medium processing device.

FIG. 13 is a block diagram depicting the third embodiment of the transparent medium processing device according to the present invention. The light source section 1, light control section 2, incident optical system section 3 and light status measurement section 4 have the same configuration as the first embodiment. In the present embodiment, a signal from the light status measurement section 4 is input to the automatic control section 5.

The value calculated based on this signal is input to the parameter control terminal of the light control section 2, and is fed back so that a desired pulse form can be automatically obtained at the processing point. This feedback can be executed as a loop two or more times. In this case, flexibility of design increases compared with the method of executing the desired control all at once, since calculation can be performed according to an algorithm which approaches the desired pulse form. The value to be input to the parameter control terminal of the light control section 2 need not be a calculated value, but may be a value which gradually changes a predetermined parameter at random, for example. In such a case, the pulse form is not always improved, but if improved, the value at that time is used, and if not, the value prior to changing the parameter is used, and the process advances to the next step, so that the system is guided to optimum conditions in steps by this looped feedback.

By the above configuration, optimum processing conditions can be automatically implemented. Also as processing advances, light status at the processing point changes, where it is possible to automatically adjust the parameters according to this change.

Fourth Embodiment of Transparent Medium Processing Device

Figure 14:
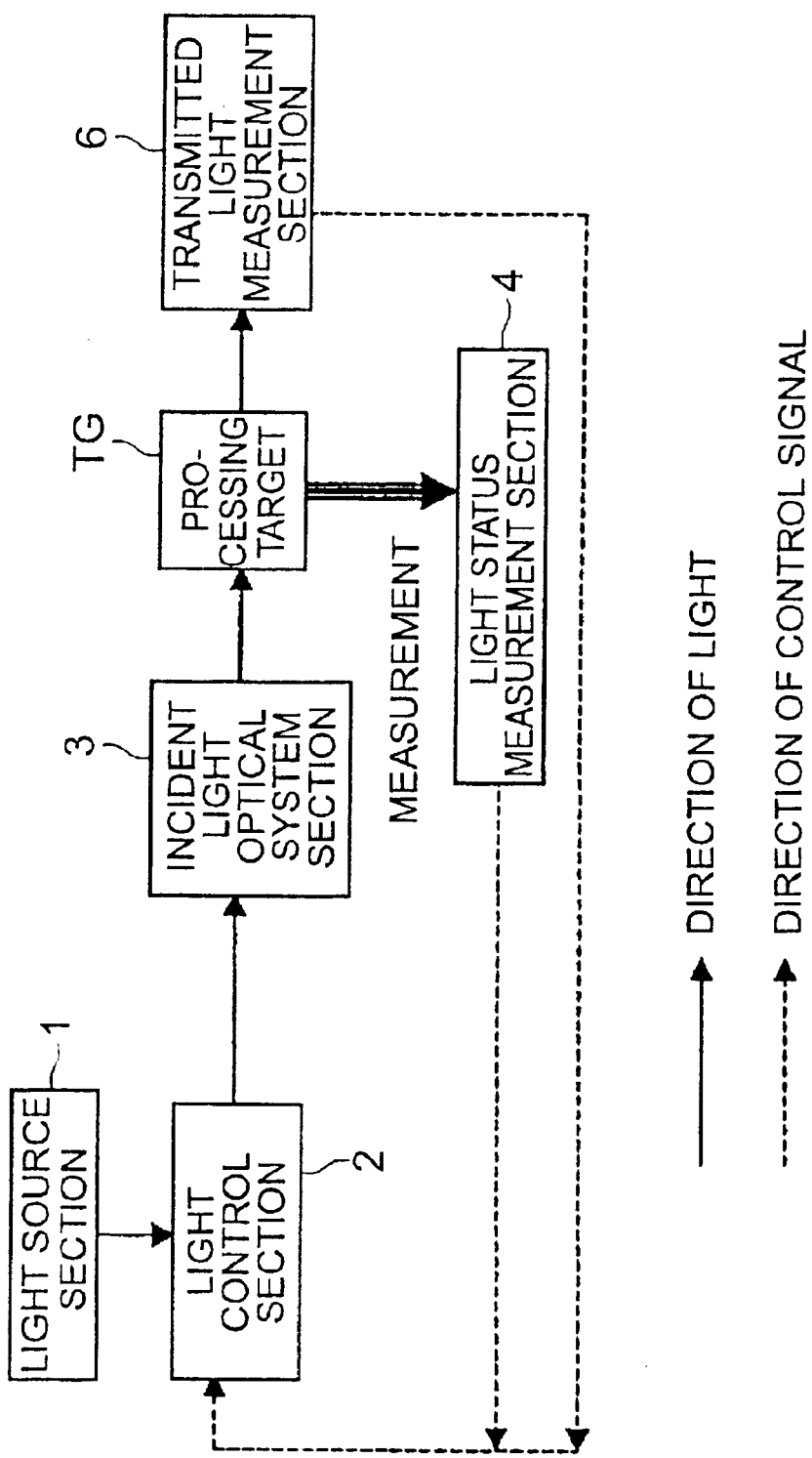
FIG. 14 is a block diagram depicting the fourth embodiment of the transparent medium processing device.

FIG. 14 is a block diagram depicting the fourth embodiment of the transparent medium processing device according to the present invention. The light source section 1, light control section 2, incident optical system section 3, and light status measurement section 4 have the same configuration as the first embodiment.

In the present embodiment, the laser beam used for processing is also used as a monitor light for optimization after the laser beam passes through the processing target TG. Therefore information on the status of transmitted light using the transmitted light measurement section 6 is also obtained.

Because of the above configuration, a control signal to be provided to the light control section 2 can be determined using signals from the light status measurement section 4 and the transmitted light measurement section 6, and as a result, more accurate control becomes possible. The detectors available for this transmitted light measurement section 6 are, for example, a spectroscope, streak camera, streak camera with a spectroscope, power meter, and a pulse width monitor (e.g. auto-correlation unit, FROG).

Fifth Embodiment of Transparent Medium Processing Device

Figure 15:
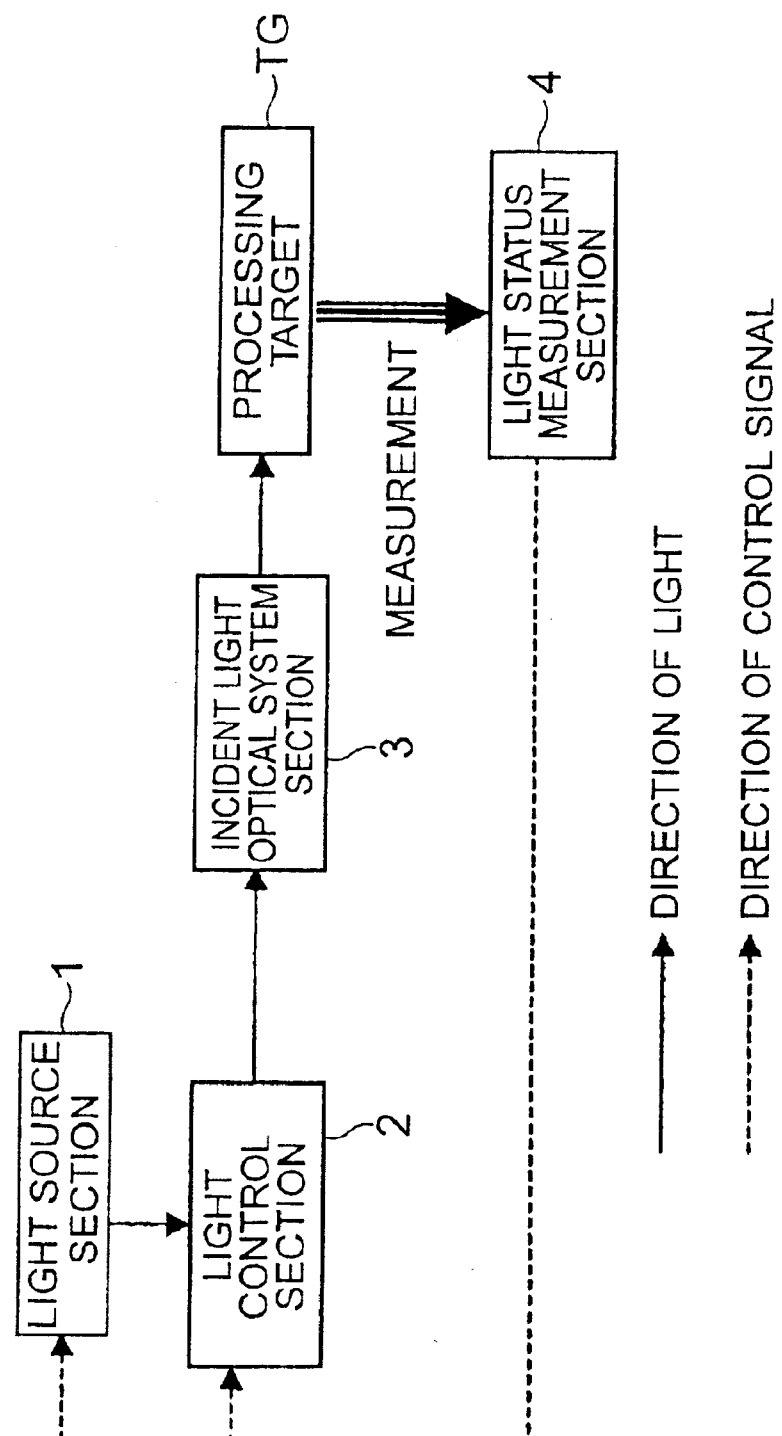
FIG. 15 is a block diagram depicting the fifth embodiment of the transparent medium processing device.

FIG. 15 is a block diagram depicting the fifth embodiment of the transparent medium processing device according to the present invention. The light control section 2, incident optical system section 3, and light status measurement section 4 have the same configuration as the first embodiment. In the present embodiment, a system which can change the status of the emitting light is used for the light source section 1.

An example of such a system is a wavelength variable light source, which is a laser where a resonator, in, which an acousto-optical transmission filter (AOTF), double refraction filter, slit, etalon, dispersion compensation section equivalent to a prism, or an arbitrary combination thereof are inserted, can be used. The wavelength of light emitted from the light source can be adjusted by making adjustments such as for the inclination of these components. If the light source section 1 has an optical amplifier, the wavelength of the emitted light can be changed by setting a filter or a slit at an appropriate position in the amplifier. With this configuration, the time waveform, spatial form, and wave front as well can be guided to an optimum status by adjusting the light source.

With the above configuration, the light source section 1 and/or the light control section 2 can be adjusted using information obtained by the light status measurement section 4 so as to obtain the required light.

Sixth Embodiment of Transparent Medium Processing Device

Figure 16:
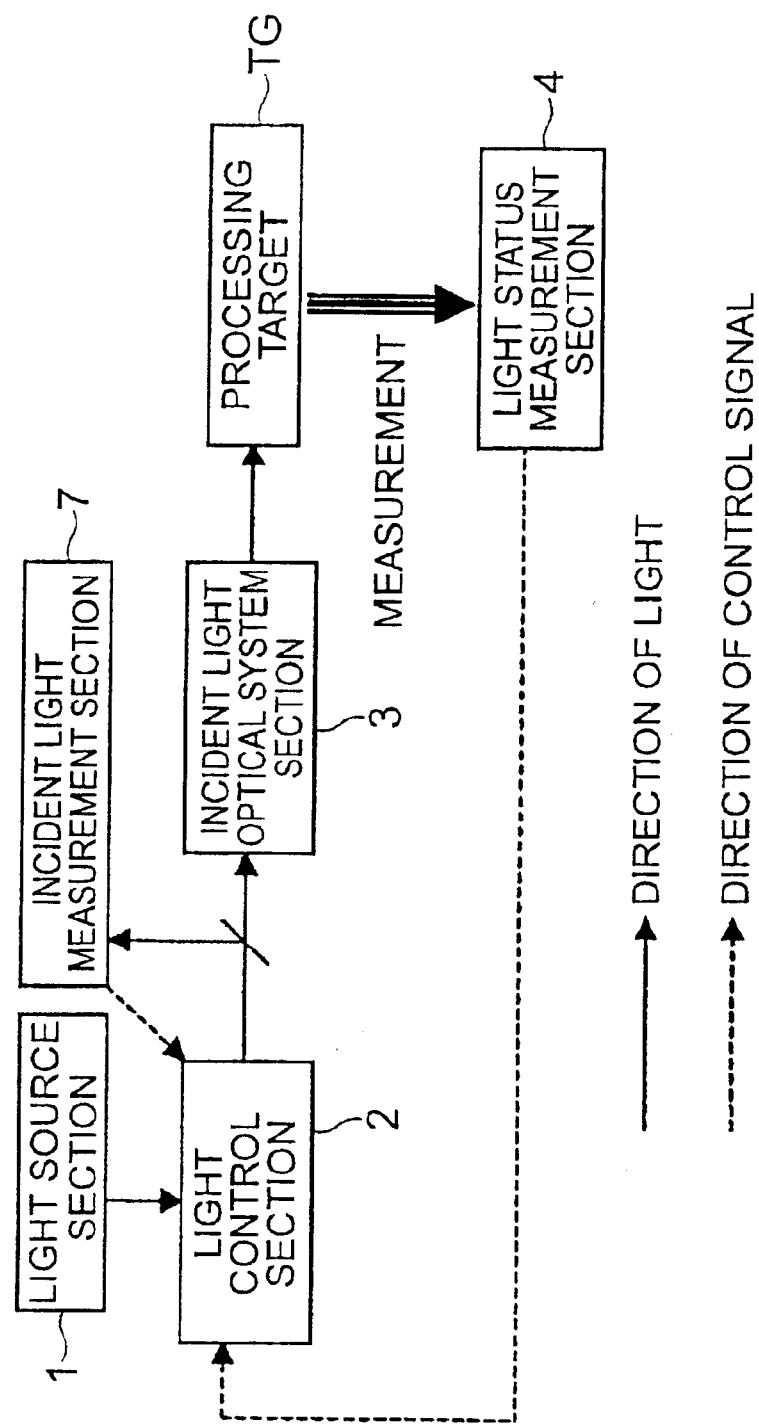
FIG. 16 is a block diagram depicting the sixth embodiment of the transparent medium processing device.

FIG. 16 is a block diagram depicting the sixth embodiment of the transparent medium processing device according to the present invention. The light source section 1, light control section 2, incident optical system section 3, and light status measurement section 4 have the same configuration as the first embodiment. In the present embodiment, the status of the light modulated by the light control section 2 is measured using the incident light measurement section 7 before entering the processing target TG. By this, the control signal to be provided to the light control section 2 can be determined more easily.

The detectors available for the incident light measurement section 7 are, for example, a spectroscope, streak camera, streak camera with a spectroscope, power meter, and pulse width monitor (e.g. auto-correlation unit, FROG).

Seventh Embodiment of Transparent Medium Processing Device

Figure 17:
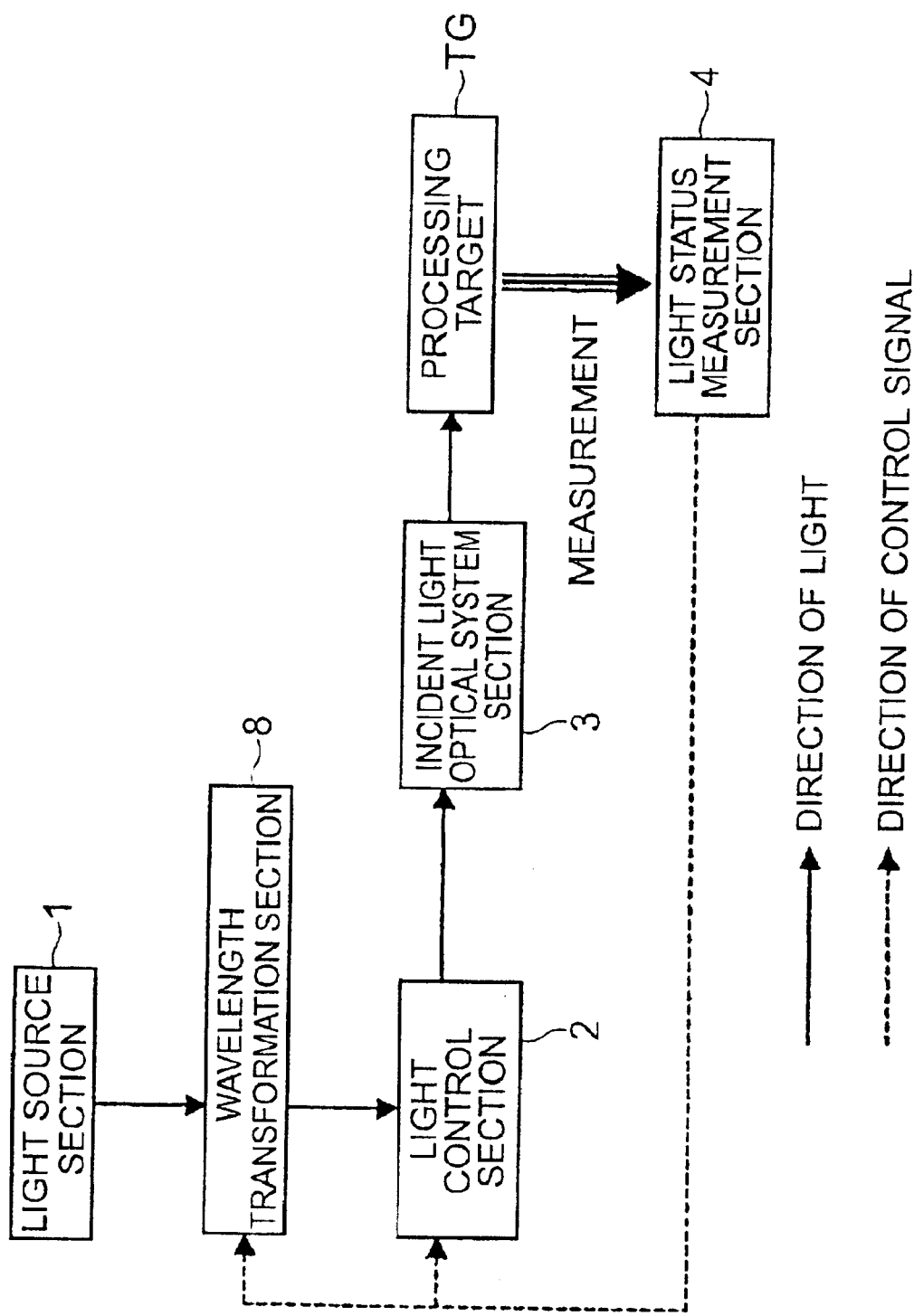
FIG. 17 is a block diagram depicting the seventh embodiment of the transparent medium processing device.

FIG. 17 is a block diagram depicting the seventh embodiment of the transparent medium processing device according to the present invention. The light source section 1, light control section 2, incident optical system section 3, and light status measurement section 4 have the same configuration as the first embodiment. In the present embodiment, the wavelength of the light to be generated by the light source section 1 can be transformed by using the wavelength transformation section 8. According to this arrangement, light with a wavelength which the light source section 1 alone cannot generate can be obtained. Since this wavelength transformation process is generally controllable, the waveform transformation can be adjusted to an optimum by using the result obtained by the light status measurement section 4.

The systems available for the wavelength transformation section 8 are, for example, a high-order harmonic generator, such as a second harmonic generator, electro-optical modulator, acousto-optical modulator, a device using an optical parametric process, such as OPO and OPA, or a combination thereof. Light used for processing generally has a high intensity, so an auto-phase modulation effect may be generated by allowing the light to pass through a medium with high non-linearity to perform wavelength transformation. In FIG. 17, the wavelength transformation section 8 is disposed between the light source section 1 and the light control section 2, but can also be disposed between the light control section 2 and the incident optical system section 3, or between the incident optical system section 3 and the processing target TG.

According to the transparent medium processing device of the present invention, the status of an incident light can be changed while monitoring the status of light at the processing point inside a transparent medium, which is the processing point. This makes it possible to execute laser processing optimizing the light status at the processing point, so a desired form can be processed efficiently. Also the light status can be automatically controlled, which further improves processing efficiency. Complicated incident light conditions can be implemented by performing calculation with an appropriate algorithm.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A transparent medium processing device comprising:
    a light source section for generating a laser beam with a wavelength which has transparency with respect to a processing target, wherein said light source section is a pulse laser light source for generating pulse laser beams having femto-second pulse width;
    a light control section for executing a variable control for the status of the laser beam emitted from said light source section, wherein said light control section includes a spatial form shaping section for shaping a spatial form of a laser beam;
    an incident optical system section for entering the laser beam controlled by said light control section to the processing target; and
    a light status measurement section for measuring the status of the laser beam inside the processing target;
    wherein said light control section is adjusted based on the output of said light status measurement section so that the status of the laser beam inside the processing target becomes a desired status, the processing target being the transparent medium, thereby the laser beam status inside the transparent medium is fed back to said light control section.

2. The transparent medium processing device according to claim 1, wherein said light control section includes a time waveform shaping section for shaping a time waveform of a laser beam.

3. The transparent medium processing device according to claim 1, wherein said light control section includes a wave front control section for controlling a wave front of a laser beam.

4. The transparent medium processing device according to claim 1, wherein said light status measurement section further comprises a light track observation unit for detecting a track of a laser beam inside said processing target.

5. The transparent medium processing device according to claim 1, wherein said light status measurement section measures the light status by observing the scattered light from inside said processing target by a streak camera.

6. The transparent medium processing device according to claim 1, wherein said light status measurement section measures the light status by observing with a streak camera after dispersing the scattered light from inside said processing target by a spectroscope.

7. The transparent medium processing device according to claim 1, wherein said light status measurement section measures the light status by observing the scattered light from inside said processing target with a pulse width monitor.

* * * * *